(12) United States Patent
Nam et al.

(10) Patent No.: US 8,760,893 B2
(45) Date of Patent: Jun. 24, 2014

(54) FULL BRIDGE SWITCHING CIRCUIT

(75) Inventors: Kwang-woo Nam, Seoul (KR);
Jung-nam In, Seoul (KR); Jun-Deok Choi, Seoul (KR); Min-ki Ahn, Seoul (KR)

(73) Assignee: Rohm Co., Ltd. (JP)

( * ) Notice: Subject to any disclaimer, the term of this patent is extended or adjusted under 35 U.S.C. 154(b) by 252 days.

(21) Appl. No.: 13/268,209

(22) Filed: Oct. 7, 2011

(65) Prior Publication Data

US 2013/0088077 A1    Apr. 11, 2013

(51) Int. Cl.
*H02M 7/00* (2006.01)
*H02M 3/335* (2006.01)

(52) U.S. Cl.
USPC .............................. 363/65; 363/17; 363/132

(58) Field of Classification Search
USPC ................. 363/65, 71, 132–134, 17; 323/267
See application file for complete search history.

(56) References Cited

U.S. PATENT DOCUMENTS

| 7,023,718 | B2* | 4/2006 | Huang et al. | 363/132 |
| 7,291,991 | B2* | 11/2007 | Chen | 315/307 |
| 7,295,448 | B2* | 11/2007 | Zhu | 363/17 |
| 2011/0051468 | A1* | 3/2011 | Kyono | 363/21.02 |

* cited by examiner

*Primary Examiner* — Jessica Han
(74) *Attorney, Agent, or Firm* — Cantor Colburn LLP

(57) ABSTRACT

A full bridge switching circuit includes a converter circuit including first and second converters. The first converter includes a first transformer and a first switching element part to control the first transformer in response to a first switching signal. The second converter includes a second transformer and a second switching element part to control the second transformer in response to a second switching signal. The first and second transformers are controlled by the first and second switching element parts to output first and second feedback signals, respectively. The full bridge switching circuit further includes a third switching element part having a third switching input connected to the first and second transformers, and an IC circuit to generate an OR signal by an OR operation of a first control signal generated from the first feedback signal and a second control signal generated from the second feedback signal.

11 Claims, 3 Drawing Sheets

FULL BRIDGE SWITCHING CIRCUIT

TECHNICAL FIELD

The present disclosure relates generally to a full bridge switching circuit and, more particularly, to a two-channel full bridge switching circuit having 6 switching elements.

BACKGROUND

An electronic device such as a power supply or an inverter to output high electric power typically includes a converter circuit which according to a control signal of a PWM circuit, amplifies the electric power to be delivered to a load. In general, such a converter circuit includes a switching circuit which converts a DC voltage signal into an AC voltage signal under control of the PWM signal. An example of the switching circuit which converts a DC voltage signal into an AC voltage signal may include a half-bridge switching circuit, a full-bridge switching circuit and a push-pull switching circuit. Among these, the full-bridge switching circuit which includes a monopolar power source and four switching elements is a switching circuit which is used for large output capacities and high output voltages.

A single channel full-bridge switching circuit having a single channel is sometimes called a "H-bridge" since a total of 4 switching elements are arranged in the form of an H with a primary coil of a transformer interposed therebetween. Typically, the full-bridge switching circuit controls the output voltage by changing the ON pulse width of each switching element while alternately making the switching elements arranged in the form of an H conductive.

With the increase in size of various electronic devices, two-channel full-bridge switching circuits have been increasingly used in place of single channel full-bridge switching circuits. A conventional two-channel full-bridge switching circuit is generally constructed using two single-channel full-bridge switching circuits, including a total of 8 switching elements. Since each channel in the two-channel full-bridge switching circuit needs to be separately controlled, an integrated circuit (IC) has to control operation of the respective 8 switching elements. However, since such two-channel full-bridge switching circuits have many switching elements, the configuration is complicated which increases the cost and size of the circuit.

Relating to the above problem, in an effort to reduce the number of switching elements, a two-channel full-bridge switching circuit having 6 switching elements has been developed. Such a switching circuit is configured to short-circuit one terminal of each primary coil of the transformers for two channels to form a common node, and use two switching elements connected to the common node commonly for both channels. The switching circuit having such configuration has to control the channels separately and, therefore, employs a phase-shift method to obtain a desired result by controlling the ON/OFF time of the remaining switching elements for circuit operation based on the ON/OFF time of a switching element connected to the common node and a corresponding potential of the common node.

Therefore, there is a need for a two-channel full-bridge switching circuit having 6 switching elements, which is capable of controlling channels separately without using a complicated phase-shift method for control.

SUMMARY

The present disclosure provides some embodiments of a two-channel full-bridge switching circuit having 6 switching elements, which is capable of controlling channels separately without using a complicated phase-shift method for control.

According to one embodiment of the present disclosure, a full bridge switching circuit is provided. The full bridge switching circuit includes a converter circuit including a first converter and a second converter. The first converter includes a first transformer and a first switching element part to control the first transformer in response to a first switching signal, the second converter includes a second transformer and a second switching element part to control the second transformer in response to a second switching signal, and the first and second transformers are controlled by the first and second switching element parts to output first and second feedback signals, respectively. The full bridge switching circuit further includes a third switching element part which has a third switching input. The third switching element part is connected to the first and second transformers. An IC circuit is configured to generate an OR signal which results from an OR operation of a first control signal generated based on the first feedback signal and a second control signal generated based on the second feedback signal. The OR signal is fed back to the third switching input.

According to an alternate embodiment of the present disclosure, the third switching element part may further control the first and second transformers in response to the OR signal.

According to another alternate embodiment of the present disclosure, the third switching element part may further include first and second switches which are interconnected, and the first and second transformers may include respective primary coils. One terminal of the primary coils may be interconnected and a contact point between the first and second switches may be connected to a contact point between the primary coils. The OR signal may control ON/OFF operations of the first and second switches and the first and second switches may control the current flow of the primary coils.

According to another embodiment of the present disclosure, the first converter may include third and fourth switches to control current flow of the primary coil of the first transformer, the second converter may include fifth and sixth switches to control current flow of the primary coil of the second transformer, and the IC circuit may generate a third control signal to control ON/OFF operations of the third and fourth switches based on the first feedback signal and generate a fourth control signal to control ON/OFF operations of the fifth and sixth switches based on the second feedback signal.

According another alternate embodiment of the present disclosure, the first and second control signals may include both a control signal for the first switch and a control signal for the second switch.

DETAILED DESCRIPTION

An embodiment of the present disclosure will now be described in detail with reference to the drawings. In the following description, a concrete description on related functions or constructions will be omitted if it is deemed that the functions and/or construction may unnecessarily obscure the gist of the present disclosure. It should be understood that the following disclosures are merely embodiments which are not to be construed to limit the scope and spirit of the invention.

Figure 1:
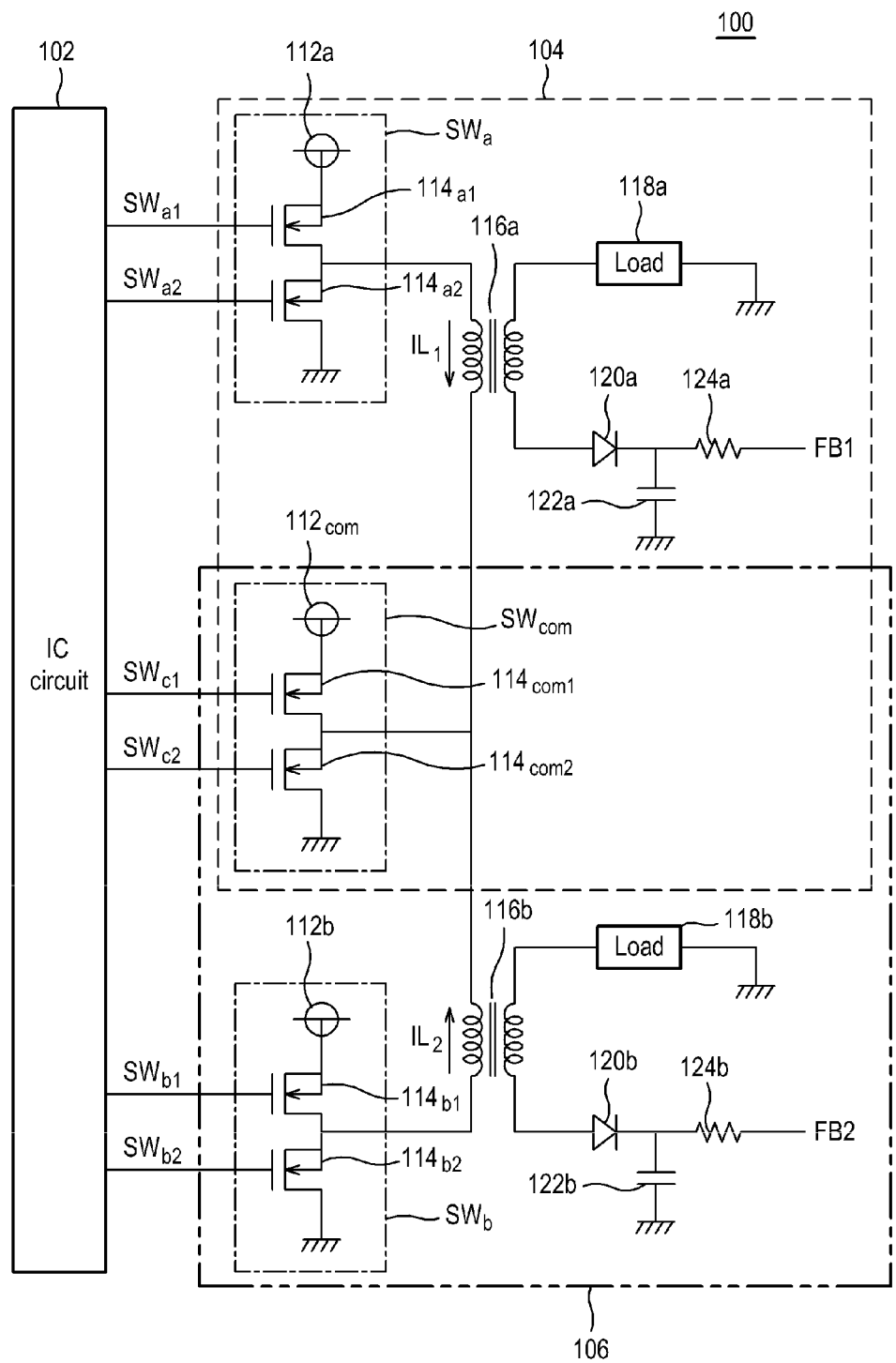
FIG. 1 is a schematic view showing a converter circuit according to one embodiment of the present disclosure.

FIG. 1 is a schematic view showing a converter circuit 100 according to one embodiment of the present disclosure. As shown, the converter circuit 100 includes an IC circuit 102, a first switching element part $SW_a$, a second switching element part $SW_{com}$ and a third switching element part $SW_b$.

The IC circuit 102 outputs 6 switch control signals $SW_{a1}$, $SW_{a2}$, $SW_{c1}$, $SW_{c2}$, $SW_{b1}$ and $SW_{b2}$. These switch control signals $SW_{a1}$, $SW_{a2}$, $SW_{c1}$, $SW_{c2}$, $SW_{b1}$ and $SW_{b2}$ output from the IC circuit 102 are PWM control signals which may define voltages to be output to loads based on combinations of ON/OFF durations of these signals. An internal configuration of the IC circuit 102 will be described later with reference to FIG. 2.

As shown in FIG. 1, the first switching element part $SW_a$, the second switching element part $SW_b$ and the third switching element part $SW_b$ may include their respective power sources 112a, 112com and 112b. These power sources 112a, 112com and 112b may be DC voltage sources.

The first switching element part $SW_a$ may include switching elements $114_{a1}$ and $114_{a2}$. According to one embodiment of the present disclosure, the switching elements $114_{a1}$ and $114_{a2}$ may be MOSFET switches without being limited thereto. As shown, a source terminal of the switching element $114_{a1}$ is connected to the power source 112a and the switch control signal $SW_{a1}$ input from the IC circuit 102 may be applied to a gate terminal of the switching element $114_{a1}$. A drain terminal of the switching element $114_{a1}$ may be connected to a source terminal of the switching element $114_{a2}$. A drain terminal of the switching element $114_{a2}$ may be grounded.

The second switch element part $SW_{com}$ may include switching elements $114_{com1}$ and $114_{com2}$. According to one embodiment of the present disclosure, the switching elements $114_{com1}$ and $114_{com2}$ may be MOSFET switches without being limited thereto. As shown, a source terminal of the switching element $114_{com1}$ is connected to the power source 112com and the switch control signal $SW_{c1}$ input from the IC circuit 102 may be applied to a gate terminal of the switching element $114_{com1}$. A drain terminal of the switching element $114_{com1}$ may be connected to a source terminal of the switching element $114_{com2}$. A drain terminal of the switching element $114_{com2}$ may be grounded.

The third switching element part $SW_b$ may include switching elements $114_{b1}$ and $114_{b2}$. According to one embodiment of the present disclosure, the switching elements $114_{b1}$ and $114_{b2}$ may be MOSFET switches without being limited thereto. As shown, a source terminal of the switching element $114_{b1}$ is connected to the power source 112b and the switch control signal $SW_{b1}$ input from the IC circuit 102 may be applied to a gate terminal of the switching element $114_{b1}$. A drain terminal of the switching element $114_{b1}$ may be connected to a source terminal of the switching element $114_{b2}$. A drain terminal of the switching element $114_{b2}$ may be grounded.

As shown, the converter circuit 100 may also include a transformer 116a. A start terminal of a primary coil of the transformer 116a is connected to a contact point between the switch elements $114_{a1}$ and $114_{a2}$ and a finish terminal of the primary coil of the transformer 116a is connected to a contact point between the switch elements $114_{com1}$ and $114_{com2}$. DC voltage signals applied from the power sources 112a and 112com may be converted into AC voltage signals according to ON/OFF control of the elements $114_{a1}$ and $114_{a2}$ and the switch elements $114_{com1}$ and $114_{com2}$ and then applied to the primary coil of the transformer 116a. The AC voltage signals applied to the primary coil of the transformer 116a may induce a predetermined voltage signal in a secondary coil of the transformer 116a and accordingly the induced voltage signal may be applied to a load 118a having one terminal connected to the secondary coil. The other terminal of the load 118a may be grounded.

As shown, the converter circuit 100 may also include a transformer 116b. A start terminal of a primary coil of the transformer 116b is connected to a contact point between the switch elements $114_{b1}$ and $114_{b2}$ and a finish terminal of the primary coil of the transformer 116b is connected to the contact point between the switch elements $114_{com1}$ and $114_{com2}$. DC voltage signals applied from the power sources 112com and 112b may be converted into AC voltage signals according to ON/OFF control of the elements $114_{b1}$ and $114_{b2}$ and the switch elements $114_{com1}$ and $114_{com2}$ and then applied to the primary coil of the transformer 116b. The AC voltage signals applied to the primary coil of the transformer 116b may induce a predetermined voltage signal in a secondary coil of the transformer 116b and accordingly the induced voltage signal may be applied to a load 118b having one terminal connected to the secondary coil. The other terminal of the load 118b may be grounded.

As shown, the opposite terminals of the secondary coils of the transformers 116a and 116b may be connected to anode terminals of diodes 120a and 120b, respectively. The diodes 120a and 120b are used to obtain a DC voltage signal by removing a negative component from an AC voltage signal. Cathode terminals of the diodes 120a and 120b may be connected to one terminal of capacitors 122a and 122b, respectively. Contact points between the cathode terminals of the diodes 120a and 120b and the capacitors 122a and 122b may be connected to one terminal of resistors 124a and 124b, respectively. The resistors 124a and 124b are used to prevent an overcurrent. The other terminals of the resistors 124a and 124b output feedback signals FB1 and FB2, respectively, which may be fed back to the IC circuit 102 although not shown.

The first switch element part $SW_a$, the second switch element part $SW_{com}$ and the transformer 116a, shown in FIG. 1, may form a first channel of the converter circuit 100. In addition, the second switch element part $SW_{com}$, the third switch element part $SW_{com}$ and the transformer 116b may form a second channel of the converter circuit 100.

Figure 2:
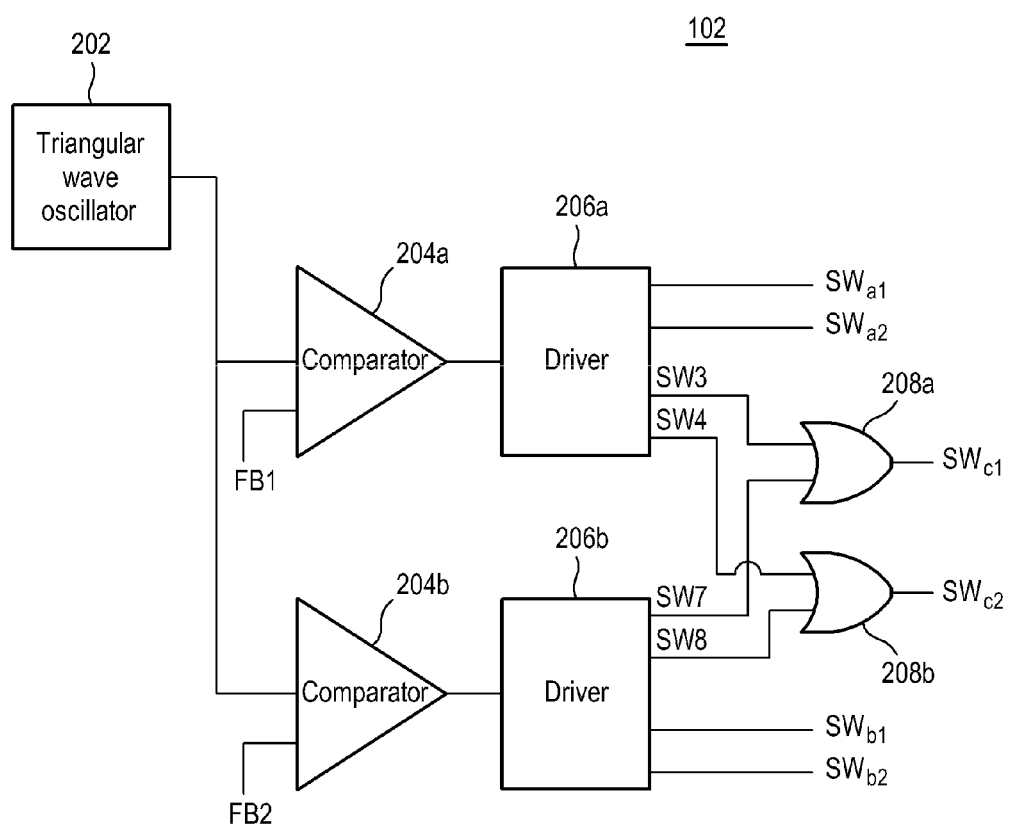
FIG. 2 is a view showing an internal configuration of an IC circuit shown in FIG. 1.

FIG. 2 is a view showing an internal configuration of the IC circuit 102 shown in FIG. 1.

As shown, the IC circuit 102 may include a triangular wave oscillator 202. The triangular wave oscillator 202 may generate a triangular wave oscillating signal according to a predetermined cycle. The triangular wave oscillating signal may be a triangular wave signal having a rising edge and a falling edge which are symmetrical, or a triangular wave signal of substantially a right triangle shape having substantially a vertical falling edge.

The IC circuit 102 may further include comparators 204a and 204b. The comparators 204a and 204b may receive the triangular wave oscillating signal generated from the triangular wave oscillator 202, as an input of their respective one terminal. The comparators 204a and 204b may receive the feedback signals FB1 and FB2 fed back from each channel of the converter circuit 100, as an input of the their respective other terminal. The comparators 204a and 204b may compare the received triangular wave oscillating signal with the received feedback signals FB1 and FB2 and output a result of the comparison.

The IC circuit 102 may further include drivers 206a and 206b. The driver 206a may receive the comparison result from the comparator 204a and generate ON/OFF control signals for the switch elements $SW_{a1}$ and $SW_{a2}$ of the converter circuit 100 based on the received comparison result. The driver 206a may also generate two additional control signals SW3 and SW4 which may be used to generate ON/OFF control signals for the switch elements $SW_{c1}$ and $SW_{c2}$ later. Likewise, the driver 206b may receive the comparison result from the comparator 204b and generate ON/OFF control signals for the switch elements $SW_{b1}$ and $SW_{b2}$ of the converter circuit 100 based on the received comparison result. The driver 206b may also generate two additional control signals SW7 and SW8 which may be used to generate ON/OFF control signals for the switch elements $SW_{c1}$ and $SW_{c2}$ later.

The IC circuit 102 may further include two OR gates 208a and 208b. The OR gate 208a may receive the control signal SW3 from the driver 206a and the control signal SW7 from the driver 206b and output a result of the OR operation for the received control signals. The OR operation result output from the OR gate 208a may be input as an ON/OFF control signal for the switch element $SW_{c1}$. The OR gate 208b may receive the control signal SW4 from the driver 206a and the control signal SW8 from the driver 206b and output a result of the OR operation for the received control signals. The OR operation result output from the OR gate 208b may be input as an ON/OFF control signal for the switch element $SW_{c2}$.

Figure 3:
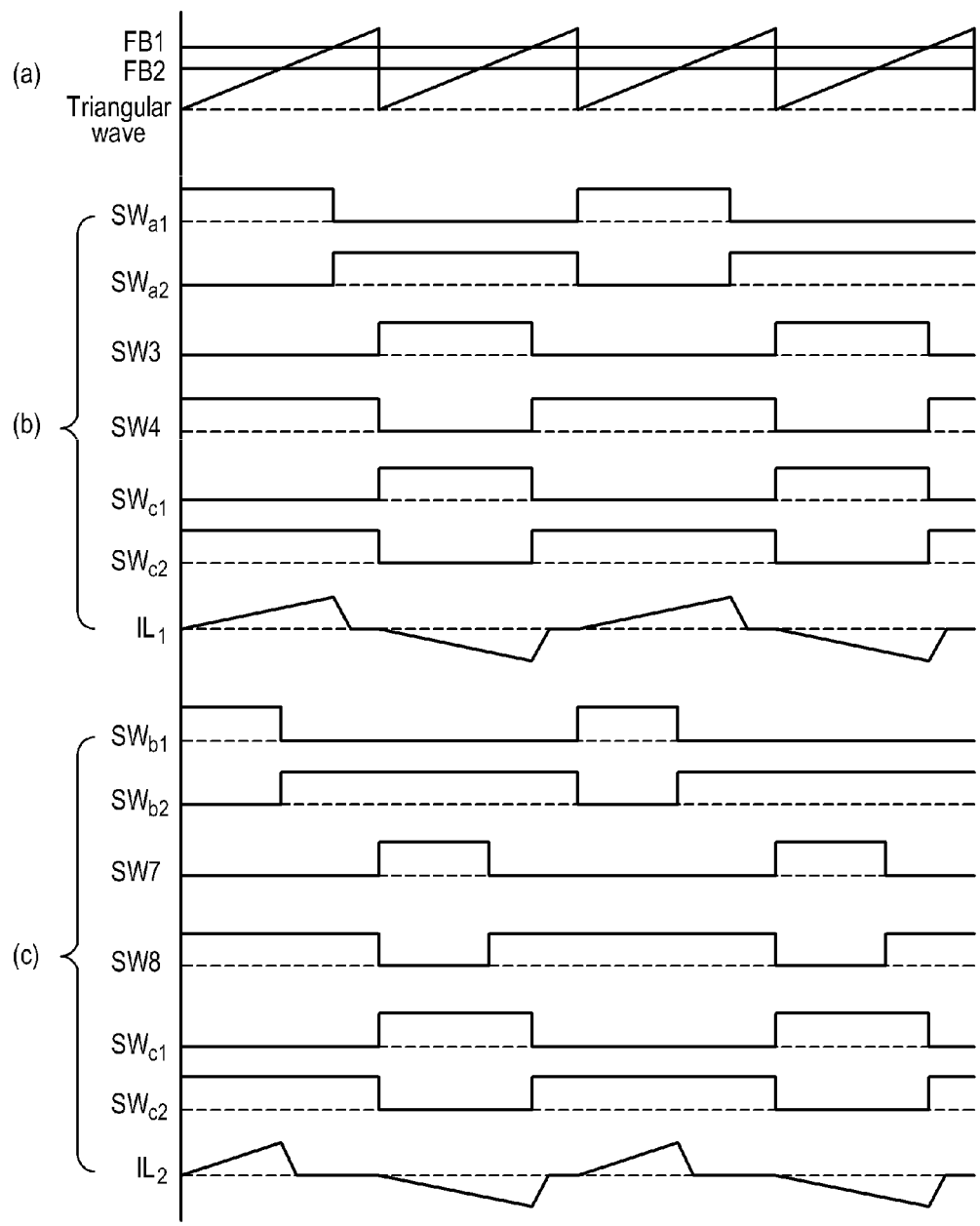
FIG. 3 is a timing chart showing: (a) a relationship among a triangular wave oscillating signal and feedback signals FB1 and FB2; (b) a relationship among switch control signals $SW_{a1}$, $SW_{a2}$, SW3 and SW4 output from a driver 206a, switch control signals $SW_{c1}$ and $SW_{c2}$ output from OR gates 208a and 208b, and current $IL_1$ flowing into a primary coil of a transformer 116a; and (c) a relationship among switch control signals $SW_{b1}$, $SW_{b2}$, SW7 and SW8 output from a driver 206b, the switch control signals $SW_{c1}$ and $SW_{c2}$ output from the OR gates 208a and 208b, and current $IL_2$ flowing into a primary coil of a transformer 116b.

FIG. 3 is a timing chart showing respective signals flowing in the IC circuit 102 shown in FIG. 2 and a change in a phase of current flowing through each primary coil of each transformer 116a and 116b in the converter circuit 100.

FIG. 3(a) is a timing chart showing a relationship between a triangular wave oscillating signal and the feedback signals FB1 and FB2 fed back from the converter circuit 100 to the IC circuit 102. As shown, the triangular wave oscillating signal is a saw-toothed signal having a vertical falling edge. As shown, the feedback signal FB1 has a value which is slightly greater than that of the feedback signal FB2.

FIG. 3(b) is a timing chart showing a relationship between the switch control signals $SW_{a1}$, $SW_{a2}$, SW3 and SW4 output from the driver 206a, the switch control signals $SW_{c1}$ and $SW_{c2}$ output from the OR gates 208a and 208b, and current $IL_1$ flowing into the primary coil of the transformer 116a. As shown, the switch control signal $SW_{a1}$ and the switch control signal $SW_{a2}$ are signals alternating between ON/OFF states with their respective cycles and have opposite phases. As shown, the switch control signal $SW_{a1}$ has a falling edge at a point where the triangular wave signal is greater than the feedback signal FB1, with its OFF interval longer than its ON interval. As shown, the control signal SW3 and the control signal SW4 are signals alternating between ON/OFF states with their respective cycles and have opposite phases. As shown, the control signal SW3 has a rising edge at a point where the triangular wave signal is reset, with its OFF interval longer than its ON interval. As shown, the switch control signals $SW_{c1}$ and $SW_{c2}$ and the control signals SW3 and SW4 have the same phase.

As shown in FIG. 3(b), a phase of the current $IL_1$ flowing into the primary coil of the transformer 116a has a smoothly-inclined rising edge when the switch control signals $SW_{a1}$ and $SW_{c2}$ go into an ON state and the switch control signals $SW_{a2}$ and $SW_{c1}$ go into an OFF state, and has a falling edge steeper than the rising edge from a point where the triangular wave signal is greater than the feedback signal FB1, that is, from a falling edge of the switch control signal $SW_{a1}$. In addition, the phase of current $IL_1$ flowing into the primary coil of the transformer 116a is kept at zero up to a point where the triangular wave signal is reset, that is, up to a rising edge of the switch control signal $SW_{c1}$, and has a negative potential as it falls with a smooth declination from that point. Then, this phase has a steep rising edge from a point where a next triangular wave signal is greater than the feedback signal FB1, that is, from a falling edge of the switch control signal $SW_{c2}$. Then, the phase of current $IL_1$ flowing into the primary coil of the transformer 116a is again kept at zero up to a point where the triangular wave signal is reset, that is, up to the rising edge of the switch control signal $SW_{c1}$.

FIG. 3(c) is a timing diagram showing a relationship between the switch control signals $SW_{b1}$, $SW_{b2}$, SW7 and SW8 output from the driver 206b, the switch control signals $SW_{c1}$ and $SW_{c2}$ output from the OR gates 208a and 208b, and current $IL_2$ flowing into the primary coil of the transformer 116b. As shown, the switch control signal $SW_{b1}$ and the switch control signal $SW_{b2}$ are signals alternating between ON/OFF states with their respective cycles and have opposite phases. As shown, the switch control signal $SW_{b1}$ has a falling edge at a point where the triangular wave signal is greater than the feedback signal FB2, with its OFF interval longer than its ON interval. As shown, the control signal SW7 and the control signal SW8 are signals alternating between ON/OFF states with their respective cycles and have opposite phases. In addition, the control signal $SW_{c1}$ and the control signal $SW_{c2}$ are also signals alternating between ON/OFF states with their respective cycles and have opposite phases. As shown, the control signal SW7 has a rising edge at a point where the triangular wave signal is reset, with its OFF interval longer than its ON interval. As shown, the switch control signal $SW_{c1}$ is equal to that shown in FIG. 3(b) and has an ON interval longer than that of the control signal SW7. The switch control signal $SW_{c2}$ is also equal to that shown in FIG. 3(b) and has an OFF interval longer than that of the control signal SW8.

As shown in FIG. 3(c), a phase of the current $IL_2$ flowing into the primary coil of the transformer 116b has a smoothly-inclined rising edge when the switch control signals $SW_{b1}$ and $SW_{c2}$ go into an ON state and the switch control signals $SW_{b2}$ and $SW_{c1}$ go into an OFF state, and has a falling edge steeper than the rising edge from a point where the triangular wave signal is greater than the feedback signal FB2, (i.e. from a falling edge of the switch control signal $SW_{a1}$). In addition, the phase of current $IL_2$ flowing into the primary coil of the transformer 116b is kept at zero up to a point where the triangular wave signal is reset, that is, up to a rising edge of the switch control signal $SW_{c1}$, and has a negative potential as it falls with a smooth declination from that point. Then, this phase has a steep rising edge from a point where a next triangular wave signal is greater than the feedback signal FB2, that is, from a falling edge of the switch control signal $SW_{c2}$. Then, the phase of current $IL_2$ flowing into the primary coil of the transformer 116b is again kept at zero up to a point where the triangular wave signal is reset, that is, up to the rising edge of the switch control signal $SW_{c1}$.

As shown in FIGS. 3(b) and (c), the currents flowing into the primary coils of the transformers 116a and 116b may be controlled to have different phases. It is apparent to those skilled in the art that the phases of the currents flowing into these primary coils can be properly controlled to supply desired power to a load eventually.

According to the present disclosure in some embodiments, it is possible to obtain a two-channel full-bridge switching circuit with a simple structure and easy control. The two-channel full-bridge switching circuit has advantages of a reduced number of switching elements, simple structure, reduced cost and space, and convenience in use due to separate control of channels with a simple method without complicated control of a phase-shift method.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A full bridge switching circuit comprising:
a converter circuit including a first converter and a second converter, the first converter including a first transformer and a first switching element part to control the first transformer in response to a first switching signal, the second converter including a second transformer and a second switching element part to control the second transformer in response to a second switching signal, the first and second transformers being controlled by the first and second switching element parts to output first and second feedback signals under, respectively;
a third switching element part including a third switching signal, the third switching element part being connected to the first and second transformers; and
an IC circuit configured to generate an OR signal which results from an OR operation of a first control signal generated based on the first feedback signal and a second control signal generated based on the second feedback signal, the OR signal being fed back to the third switching signal,
wherein the first and second transformers include respective secondary coils, and
wherein the first converter includes:
a first load which is connected to a first terminal of the secondary coil of the first transformer;
a first diode which has an anode connected to a second terminal of the secondary coil of the first transformer and a cathode for outputting a first DC voltage signal;
a first capacitor which is connected to the cathode of the first diode; and
a first resistor which has a first resistor terminal connected to the cathode of the first diode and a second resistor terminal to output the first feedback signal based on the first DC voltage signal.

2. The full bridge switching circuit of claim 1, wherein the third switching element part further controls the first and second transformers in response to the OR signal.

3. The full bridge switching circuit of claim 2, wherein the third switching element part further includes first and second switches which are interconnected, and
wherein the first and second transformers include respective primary coils, with one terminal of the primary coils interconnected, a contact point between the first and second switches being connected to a contact point between the primary coils, the OR signal controls ON/OFF operations of the first and second switches, and the first and second switches control current flow of the primary coils.

4. The full bridge switching circuit of claim 3, wherein the first converter includes third and fourth switches to control first current flow of the primary coil of the first transformer and the second converter includes fifth and sixth switches to control second current flow of the primary coil of the second transformer, and
wherein the IC circuit generates third and fourth control signals to control ON/OFF operations of the third and fourth switches based on the first feedback signal and generates fifth and sixth control signal to control ON/OFF operations of the fifth and sixth switches respectively based on the second feedback signal.

5. The full bridge switching circuit of claim 4, wherein the first and second control signals include both of a control signal for the first switch and a control signal for the second switch.

6. The full bridge switching circuit of claim 4, wherein a phase of the first current flowing into the primary coil of the first transformer has a smoothly-inclined rising edge when the third control signal goes into an ON state and the fourth control signal goes into an OFF state, has a falling edge steeper than the rising edge from a falling edge of the third control signal, is kept at zero up to a rising edge of the OR signal for controlling the first switch, and has a negative potential as the phase falls with a smooth declination from the rising edge of the OR signal for controlling the first switch.

7. The full bridge switching circuit of claim 4, wherein a phase of the second current flowing into the primary coil of the second transformer has a smoothly-inclined rising edge when the fifth control signal goes into an ON state and the sixth control signal goes into an OFF state, has a falling edge steeper than the rising edge from a falling edge of the fifth control signal, is kept at zero up to a rising edge of the OR signal for controlling the first switch, and has a negative potential as the phase falls with a smooth declination from the rising edge of the OR signal for controlling the first switch.

8. The full bridge switching circuit of claim 4, wherein the IC circuit further includes: OR gates which receive signals outputted from the first and second drivers to output the OR signal.

9. The full bridge switching circuit of claim 8, wherein the signals outputted from the first and second drivers to output the OR signal have rising edges at a point where the triangular wave oscillating signal is reset, and
wherein an OFF interval of the signals is longer than an ON interval of the signal.

10. The full bridge switching circuit of claim 1, wherein the second converter includes:
a second load which is connected to a first terminal of the secondary coil of the second transformer;
a second diode which has an anode connected to a second terminal of the secondary coil of the second transformer and a cathode for outputting a second DC voltage signal;
a second capacitor which is connected to the cathode of the second diode; and
a second resistor which has a first resistor terminal connected to the cathode of the second diode and a second resistor terminal to output the second feedback signal based on the second DC voltage signal.

11. A full bridge switching circuit comprising:
a converter circuit including a first converter and a second converter, the first converter including a first transformer and a first switching element part to control the first transformer in response to a first switching signal, the second converter including a second transformer and a second switching element part to control the second transformer in response to a second switching signal, the first and second transformers being controlled by the first and second switching element parts to output first and second feedback signals under, respectively;

a third switching element part including a third switching signal, the third switching element part being connected to the first and second transformers; and an IC circuit configured to generate an OR signal which results from an OR operation of a first control signal generated based on the first feedback signal and a second control signal generated based on the second feedback signal, the OR signal being fed back to the third switching signal, wherein the IC circuit includes:

a triangular wave oscillator which generates a triangular wave oscillating signal; a first comparator which compares the triangular wave oscillating signal with the first feedback signal to output a first comparison result;

a second comparator which compares the triangular wave oscillating signal with the second feedback signal to output a second comparison result;

a first driver which receives the first comparison result to generate the first switching signal and a first control signal;

a second driver which receives the second comparison result to generate the second switching signal and a second control signal; and a logic circuit which receives the first control signal and the second control signal to generate the OR signal, wherein the first feedback signal has a value which is greater than that of the second feedback signal.

* * * * *